United States Patent [19]
Kojima et al.

[11] Patent Number: 5,875,460
[45] Date of Patent: Feb. 23, 1999

[54] DISK ARRAY SUBSYSTEM AND DATA GENERATION METHOD THEREFOR

[75] Inventors: Akira Kojima, Odawara; Akihito Ogino, Naka; Soichi Isono, Chigasaki, all of Japan

[73] Assignee: Hitachi, Ltd., Tokyo, Japan

[21] Appl. No.: 975,503

[22] Filed: Nov. 21, 1997

Related U.S. Application Data

[63] Continuation of Ser. No. 524,705, Sep. 7, 1995, Pat. No. 5,765,183.

[30] Foreign Application Priority Data

Sep. 9, 1994 [JP] Japan .................................. 6-215590

[51] Int. Cl.$^6$ .............................. G06F 13/00; G06F 11/10
[52] U.S. Cl. ..................... 711/114; 395/182.04; 371/51.1
[58] Field of Search ................................. 371/40.4, 51.1, 371/114; 395/182.04

[56] References Cited

U.S. PATENT DOCUMENTS

5,191,584  3/1993  Anderson ........................... 395/182.04

*Primary Examiner*—Tod R. Swann
*Assistant Examiner*—Conley B. King, Jr.
*Attorney, Agent, or Firm*—Kenyon & Kenyon

[57] ABSTRACT

A disk drive has two channels of upper interfaces, and one channel is connected to a disk array controller, and the other channel is connected between a plurality of disk drives. A data disk drive reads the old data on the recording medium, calculates the exclusive OR of the old data and the corresponding data from the disk array controller, and transfers it to a parity disk as pseudo-parity data from the other channel. The parity disk drive reads the old parity data on the recording medium, calculates the exclusive OR of the old parity data and the pseudo-parity data, and writes it as new parity data.

12 Claims, 8 Drawing Sheets

*PRIOR ART*

1

DISK ARRAY SUBSYSTEM AND DATA GENERATION METHOD THEREFOR

CROSS-REFERENCE TO RELATED APPLICATION

This application is a continuation of U.S. application Ser. No. 08/524,705, filed Sep. 7, 1995, now U.S. Pat. No. 5,765,183.

BACKGROUND OF THE INVENTION

1. Field of the Invention

The present invention relates to a disk array subsystem for connecting and operating a plurality of disk drives in parallel and a data generation method therefor and particularly to a disk array subsystem for realizing a reduction in a write penalty in RAID4 (redundant array of inexpensive disks) and RAID5.

2. Description of the Prior Art

Figure 7:
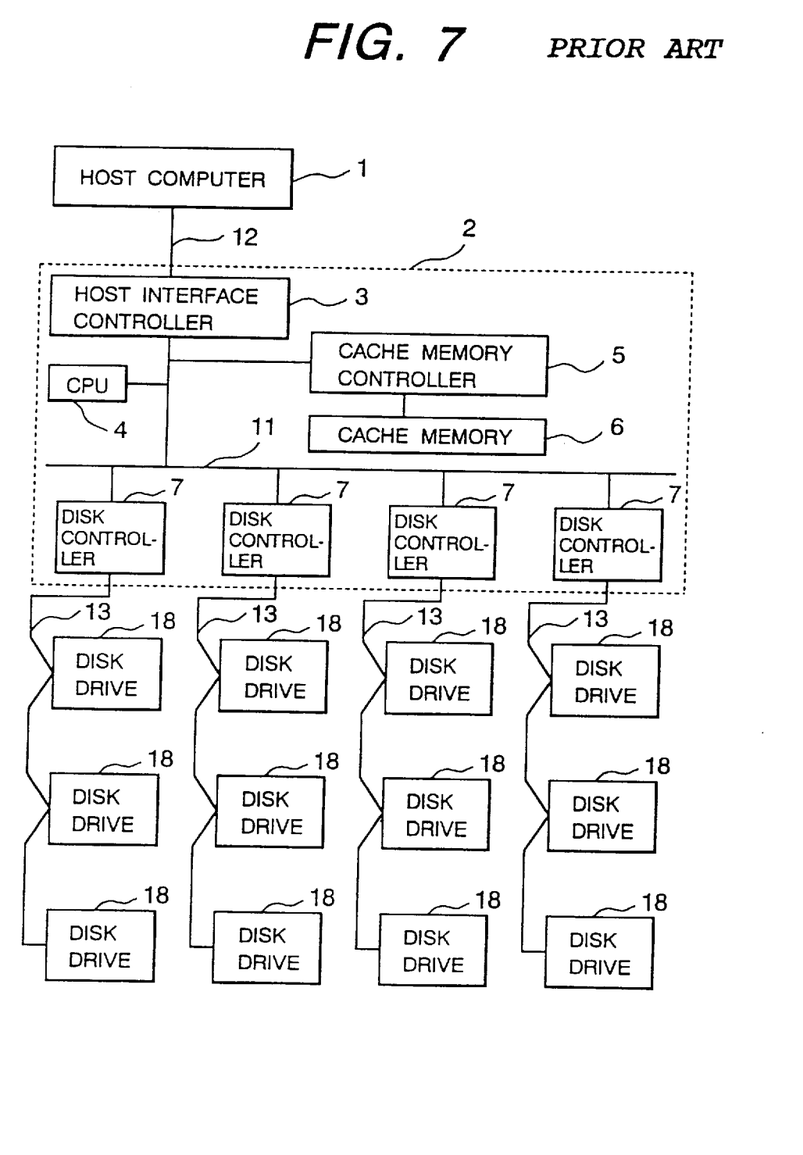
FIG. 7 is a block diagram of a conventional disk array subsystem.

A disk array subsystem is a magnetic disk drive for connecting and operating a plurality of inexpensive small disk drives in parallel so as to realize performance equivalent to that of a SLED (single large expensive disk). A general arrangement of a disk array is shown in FIG. 7. This disk array comprises a disk array controller 2 which is connected to a host computer 1 via a host interface 12 and a plurality of disk drives 18 which are connected to the disk array controller 2 and operate in parallel. The disk array controller 2 comprises a host interface controller 3 for storing a read or write instruction from the host computer 1 once, a CPU 4 for controlling the operation of the disk array controller 2, a cache memory 6 for storing data transferred between the host computer 1 and the disk drives 18, a cache memory controller 5 for controlling the cache memory, and a disk controllers 7 for controlling data transfer between the disk array controller 2 and the disk drives 18.

When the cache memory controller 5 confirms at the time of reading that requested data exists in the cache memory 6, the data is transferred from the cache memory 6 to the host computer 1 via the host interface 12. When the requested data does not exist in the cache memory 6, the CPU 4 stores the data in the cache memory 6 from a disk drive 18 storing the data via the disk controller 7 and the cache memory controller 5. The cache memory controller 5 transfers the data to the host computer 1 after the storing ends or in parallel with the storing.

At the time of writing, write data transferred from the host computer 1 is stored in the cache memory 6 by the cache memory controller 5 via the host interface 12 and the host interface controller 3. The cache memory controller 5 writes the write data into the disk drive 18 designated by the CPU 4 via the disk controller 7 after the storing ends or in parallel with the storing.

To maintain reliability, the disk array subsystem generates parity on data stored on a plurality of data disks and stores it on a parity disk. In RAID4, the parity disk is fixed in a special disk drive. In RAID5, for avoiding performance reductions caused by access concentration on the parity disk, the parity is distributed evenly to all the disk drives for each data.

U.S. Pat. No. 5,191,584 discloses a data updating method in a disk array subsystem of RAID4 or RAID5. According to this data updating method, when a disk array controller accesses one data disk by each processing unit, there is no need of accessing all the data disks, even when writing data. The disk array controller calculates new parity data by the exclusive OR of the old data of the data disk for writing, the old parity data of the parity disk, and new data transferred from the host computer and updates the parity disk according to the new parity data. Therefore, another process can be executed for disks other than the data disk for writing and the parity disk. Particularly in RAID5, no parity disk is specified, so that the write process can be executed at the same time.

Figure 8:
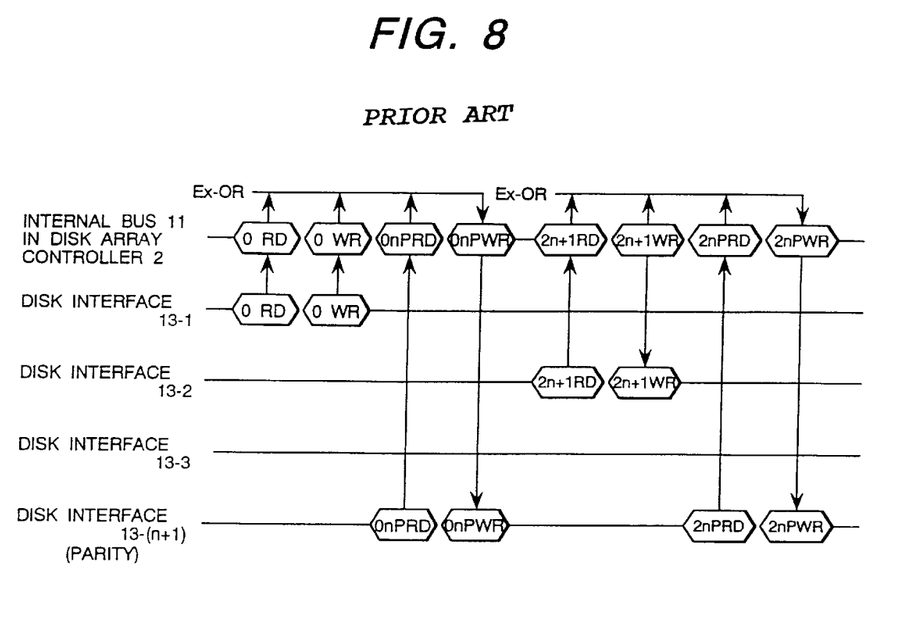
FIG. 8 is a time chart of data transfer of RAID5 for writing in a conventional example.

A problem caused by this method is that the five processes indicated below are generated because the parity disk is updated for writing data as shown in FIG. 8 and the processing capacity is lowered.

1) Reading the old data from the data disk at the corresponding address

2) Reading the old parity data from the parity disk at the corresponding address 3) Writing new data on the data disk at the corresponding address 4) Calculating the exclusive OR of the new data, old data, and old parity data and obtaining new parity data 5) Writing the new parity data on the parity disk The four processes except 4) among the aforementioned five processes are accompanied by an access to disk drives process and it causes a performance reduction of the disk array subsystem. This performance reduction due to increase in access to disk drives processes for updating of the parity disk which occurs when writing data, is called a write penalty. Conventionally, one manner of improving such write penalty is known as the use of pseudo-parity which works as follows. In case a plurality of disk drives have a common parity, when one of the disk drives is written by a new data, the corresponding new parity data, i.e., a parity data obtained by calculating the exclusive OR of the new data and the corresponding old data is called a pseudo-parity of the new data. The pseudo-parity works as a new parity data which is common to all the plurality of the disk drives corresponding to the new data, and therefore is called a pseudo-parity.

SUMMARY OF THE INVENTION

An object of the present invention is to provide a disk array subsystem for preventing the performance from deteriorating even if the access process to a recording medium is increased by a write penalty for writing data, and a method therefor.

To accomplish the above object, in the disk array subsystem of the present invention comprising a plurality of magnetic disk storage means, at least one magnetic disk storage means among the above magnetic disk storage means acquires data (new data) to be written into one magnetic disk storage means among the above plurality of magnetic disk storage means, reads the data (old data) in its own magnetic disk storage means which corresponds to the new data, calculates the exclusive OR of the new data and the old data, generates the calculated data, and writes the calculated data in the corresponding address in its own magnetic disk storage means or transfers it to the upper apparatus or another magnetic disk storage means.

A disk drive employed in the disk array subsystem of the present invention has at least two interfaces. The first interface connects the disk controller and a disk drive and the second interface connects a plurality of disk drives having common parity.

New data transferred from the host computer is transferred to a disk drive by the disk array controller. The disk drive receives the new data by the first interface, reads the old data on the recording medium at the same time, calculates the exclusive OR of the new data and the old data, transfers the result from the second interface to the parity disk as pseudo-parity data, and writes the new data on the recording medium. The disk drive in which the parity data of the new data is stored receives the pseudo-parity data via the second interface, reads the old parity data on the recording medium at the same time, calculates the exclusive OR of the pseudo-parity data and the old parity data, and writes the result on the recording medium as new parity data.

The present invention, having the aforementioned structure, has the function and operation indicated below.

According to the present invention, a disk drive executes a process for reading old data and old parity data for updating parity data of the disk array subsystem and a process for calculating and writing new parity data, so that the burden imposed on the disk array controller is lightened. Pseudo-parity data is transferred not via the disk array controller, so that a reduction in the processing capacity due to multiple simultaneous access to a disk drive from the disk controller can be prevented, and the efficiency and performance in writing data can be improved.

The foregoing and other objects, advantages, manner of operation and novel features of the present invention will be understood from the following detailed description when read in connection with the accompanying drawings.

DETAILED DESCRIPTION

Figure 1:
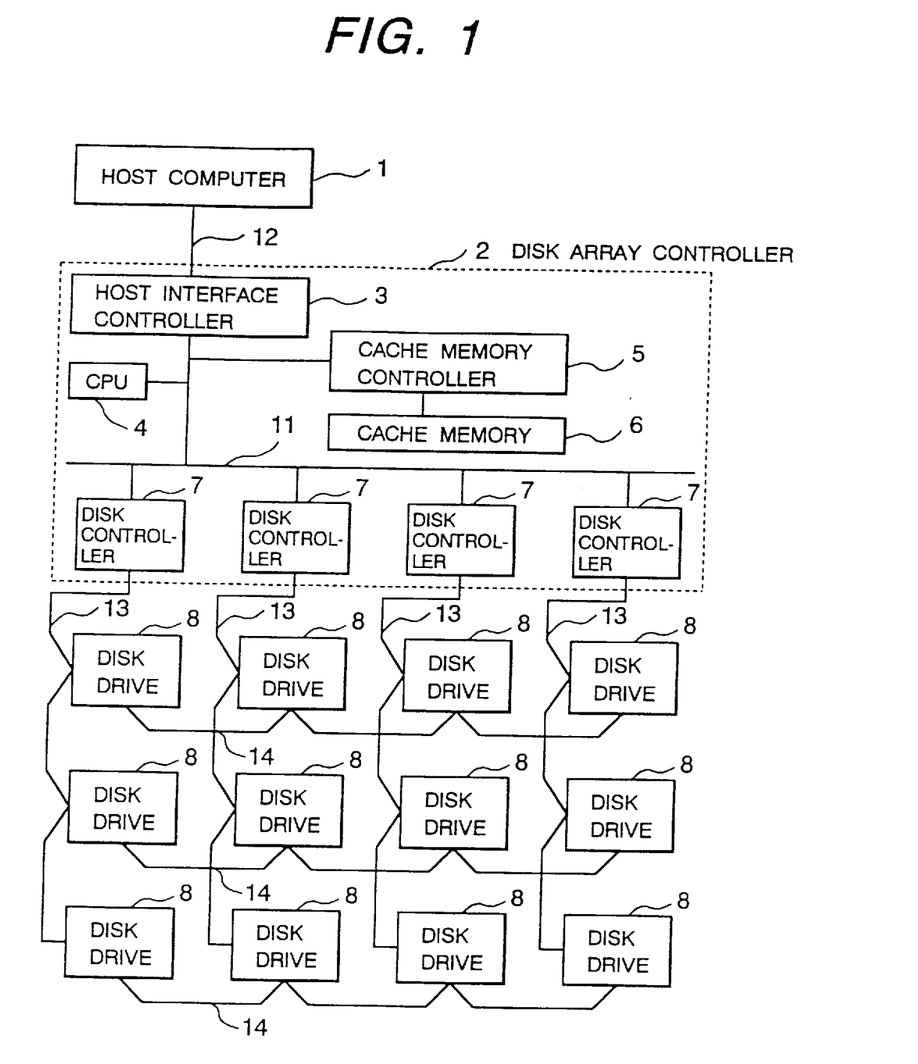
FIG. 1 is a block diagram of a disk array subsystem in an embodiment of the present invention.

FIG. 1 shows an embodiment of the present invention. In this embodiment, a parity group comprises n data disk drives and one parity disk drive. Each disk drive 8 has two interfaces. One of them is an interface 13 connected to the host computer via a disk controller 7. The other is an interface 14 for connecting disk drives constituting the parity group to each other. In this embodiment, the interface 13 is referred to as a disk interface and the interface 14 is referred to as a parity interface.

A disk drive 8 which receives a write instruction calculates the exclusive OR of new data transferred by the disk interface 13 and the old data on the disk medium and transfers the calculation result to the parity disk drive via the second interface. The parity disk drive stores the exclusive OR of the calculation result and the old parity data stored in the disk drive as new parity data.

Figure 2:
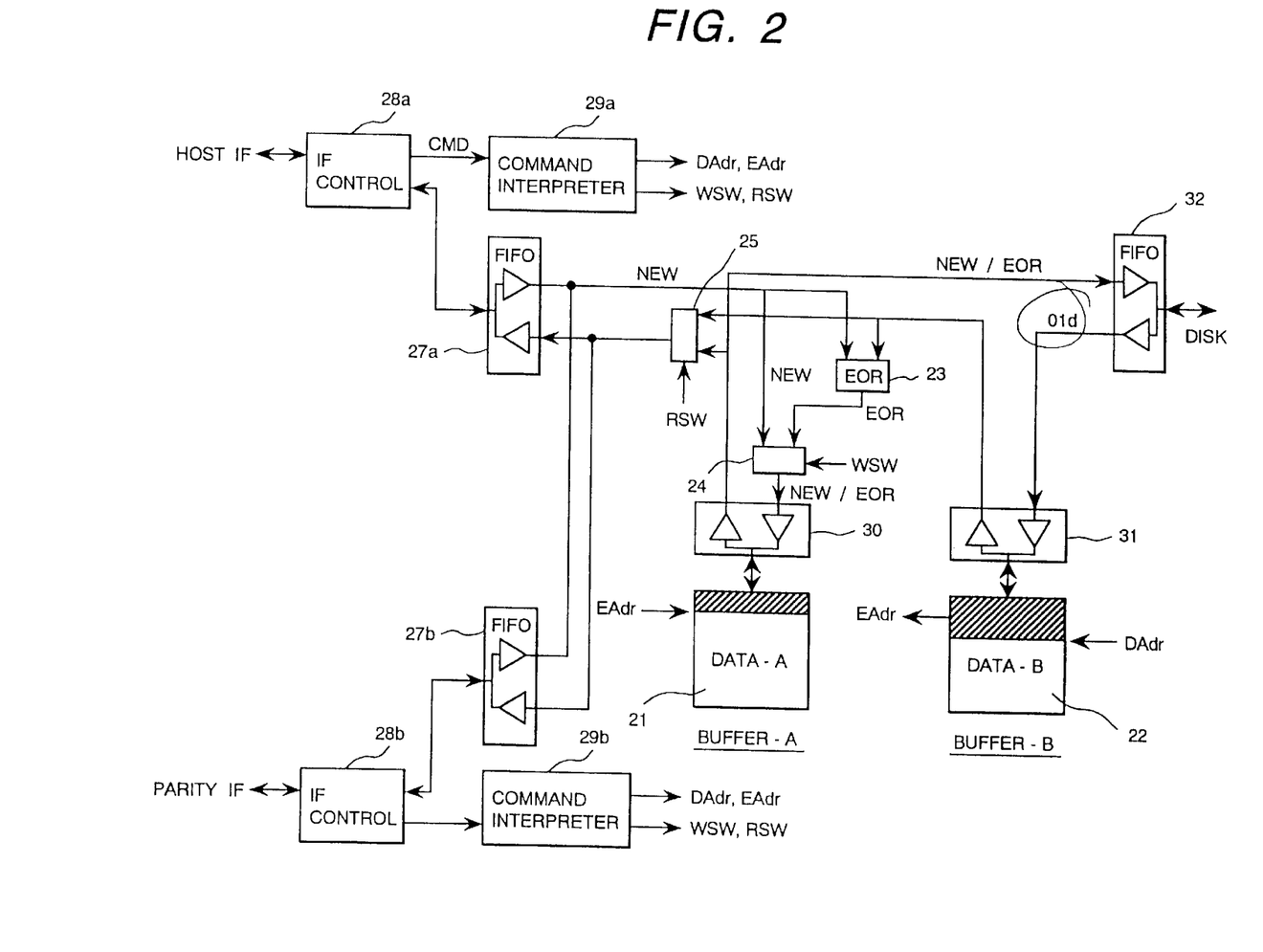
FIG. 2 is a detailed block diagram of a disk drive in an embodiment of the present invention.

FIG. 2 shows a detailed block diagram of disk drive 8. The disk drive 8 comprises a buffer memory 21 for storing data transferred from the disk interface 13 or the parity interface 14, a buffer memory 22 for storing data read from a recording medium, an arithmetic unit 23 for calculating the exclusive OR of output of the buffer memory 21 and output of the buffer memory 22, a switching unit 25 for switching the connection destination of the parity interface 14 or the disk interface 13, a switching unit 24 for switching the connection destination of the disk, interface controllers 28a and 28b between the host interface (HOST IF) and the parity interface 14 (PARITY IF), command interpreters 29a and 29b, and two data speed adjustment FIFO units 27a and 27b. The buffer memories 21 and 22 have data speed adjustment FIFO units 30 and 31 for input and output. The disk interface has a data speed adjustment FIFO unit 32 for input and output: The old data "old" is read from the disk drive, in correspondence with the inputting of new data and its exclusive OR(NEW/EOR) is calculated, and is supplied to FIFO unit 31, as shown in FIG. 2.

When the disk drive is a data disk, the buffer memory 21 stores the exclusive OR of the write data (new data) transferred from the disk interface 13 and the old data at the corresponding address which is read from the disk, and when the disk drive is a parity disk, the buffer memory 21 stores the exclusive OR of the pseudo-parity data transferred from the parity interface 14 and the old parity data at the corresponding address which is read from the disk.

The switching units 24 and 25 select EOR23 for a write penalty countermeasure of the RAID of the present invention. For executing normal read/write, they select OLD/NEW.

The buffer memory 22 stores the old data or old parity data of the recording medium 26. When the disk drive is a data disk, the exclusive OR of the new data and old data is stored in the buffer memory 21, selected by the switching unit 25, and outputted to the parity interface 14. When the disk drive is a parity disk, the exclusive OR of the pseudo-parity data and old parity data is stored on the recording medium 26 as new parity data from the FIFO unit 32.

Figure 3:
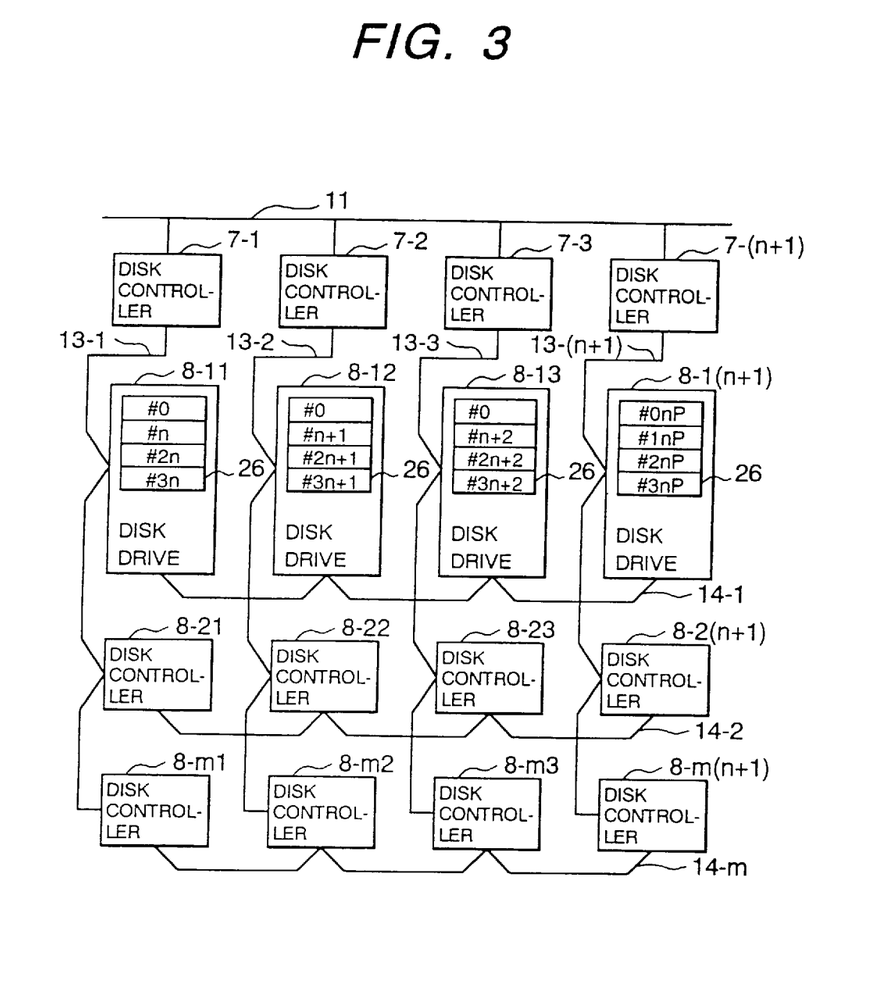
FIG. 3 is a block diagram of RAID4 in an embodiment of the present invention.

FIG. 3 shows an embodiment of the present invention and the arrangement in the case of RAID4. In RAID4, the parity disks are fixed. In this embodiment, the disk drives 8-1(n+1) to 8-m(n+1) are parity disks. 7-1, 7-2, . . . 7-(n+1) are disk controllers corresponding to disk controllers 7 of FIG. 1, wherein 7-1 . . . 7-3 are controllers for data disks, and the 7-(n+1) controller is a parity disk controller. 13-1 . . . 13-(n+1) are disk interfaces corresponding to parity interfaces 13 of FIG. 1. 14-1 . . . 14-m are parity interfaces corresponding to parity interfaces 14 of FIG. 1. 8-21 . . . 8-2(n+1), 8-m1 . . . 8-m(n+1) are disk drives corresponding to disk drives 8 of FIG. 1.

Figure 4:
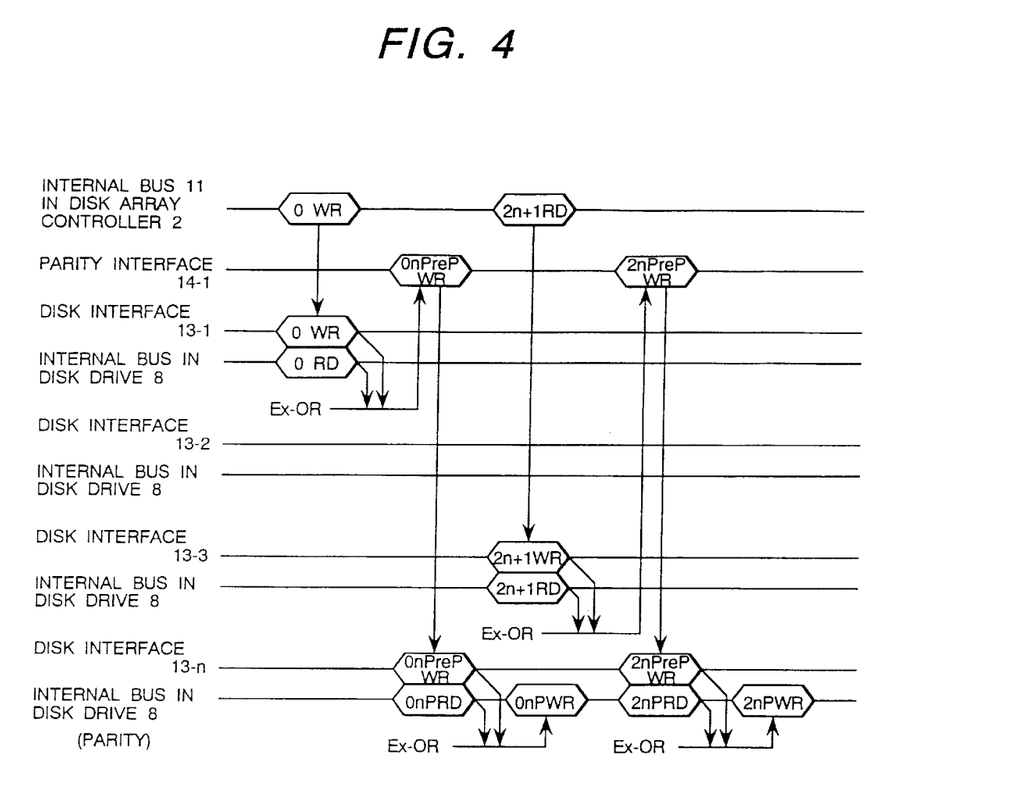
FIG. 4 is a time chart of the operation of RAID4 for writing in an embodiment of the present invention.

FIG. 4 shows detailed processing of this embodiment. The disk drive 8-11 which receives write data to address #0 from the disk controller 7-1 via the interface 13-1:

1) reports the end to the disk controller 7-1 at the time when all the data is received in the buffer memory 21 in the disk drive, 2) reads the old data at address #0 on the recording medium, (this process may be read in the buffer memory B beforehand or may be executed in parallel with writing new data into the buffer), 3) calculates the exclusive OR of new data and the old data, 4) assumes the calculation result as pseudo-parity and transfers it to the disk drive for storing parity data at the corresponding address via the interface 14-1, and 5) writes the new data at address #0 on the recording medium 26.

The parity disk drive 8-1(n+1) which receives the pseudo-parity from the data disk drive 8-11 via the interface 14-1:

1) reports the end to the data disk drive 8-11 at the time when all the data is received in the buffer memory 21 in the disk drive, 2) reads the old parity data at address #0nP on the recording medium 26, (this process may be read in the buffer memory 22 beforehand or may be executed in parallel with writing the pseudo-parity data into the buffer), 3) calculates the exclusive OR of the pseudo-parity data and the old parity data, and 4) assumes the calculation result as new parity data and writes it at address #0nP on the recording medium 26.

According to the aforementioned processes, the disk drive sends an end report when the data from the upper apparatus is stored in the buffer memory of the disk drive, so that the processing time for writing of data can be shortened viewed from the upper apparatus.

Figure 5:
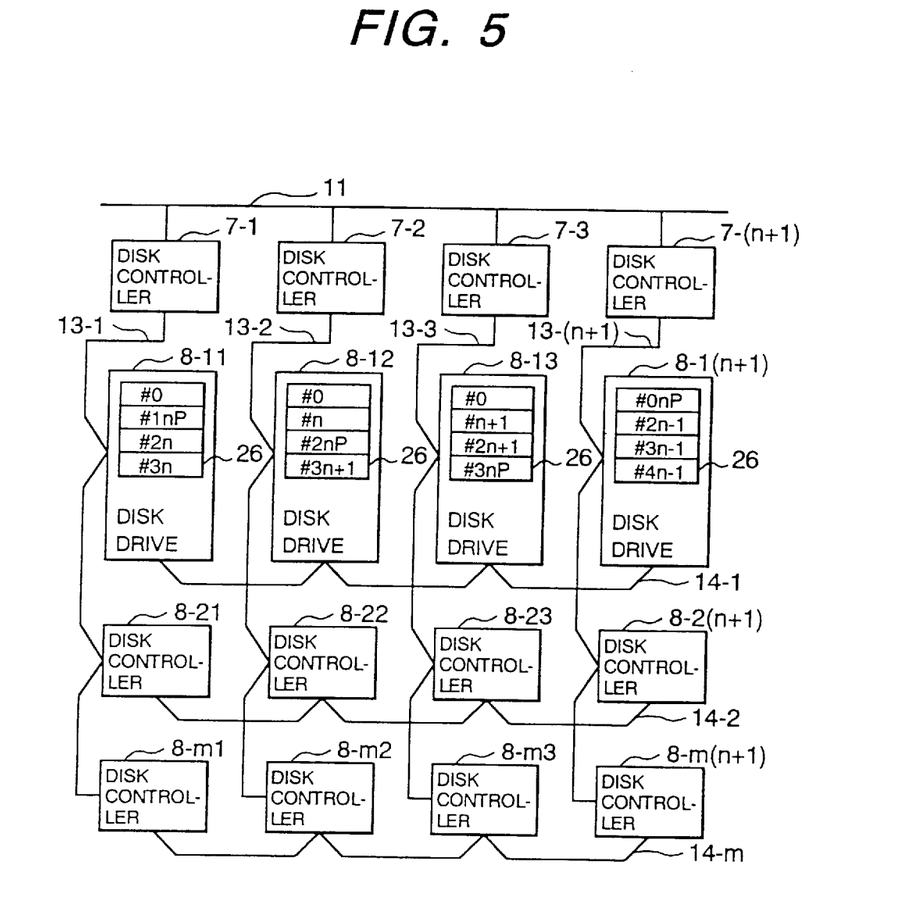
FIG. 5 is a block diagram of RAID5 in an embodiment of the present invention.

FIG. 5 shows another embodiment of the present invention in which the arrangement of the array of disk drives is a RAID 5 arrangement. In RAID 5, the parity disks are not fixed and the n+1 data disks in each row of the array rotate for each data processing operation. The other operations are the same as those in the case of RAID4. It is necessary for a data disk drive to recognize the corresponding parity disk among the disk drives so as to transfer pseudo-parity. As a means therefor, there is a method in which a disk controller instructs it in a write instruction or there is a method in which it is calculated from the remainder when the address is divided by (n+1) and the ID number of the disk drive itself because the parity data is shifted sequentially as shown in this embodiment.

Figure 6:
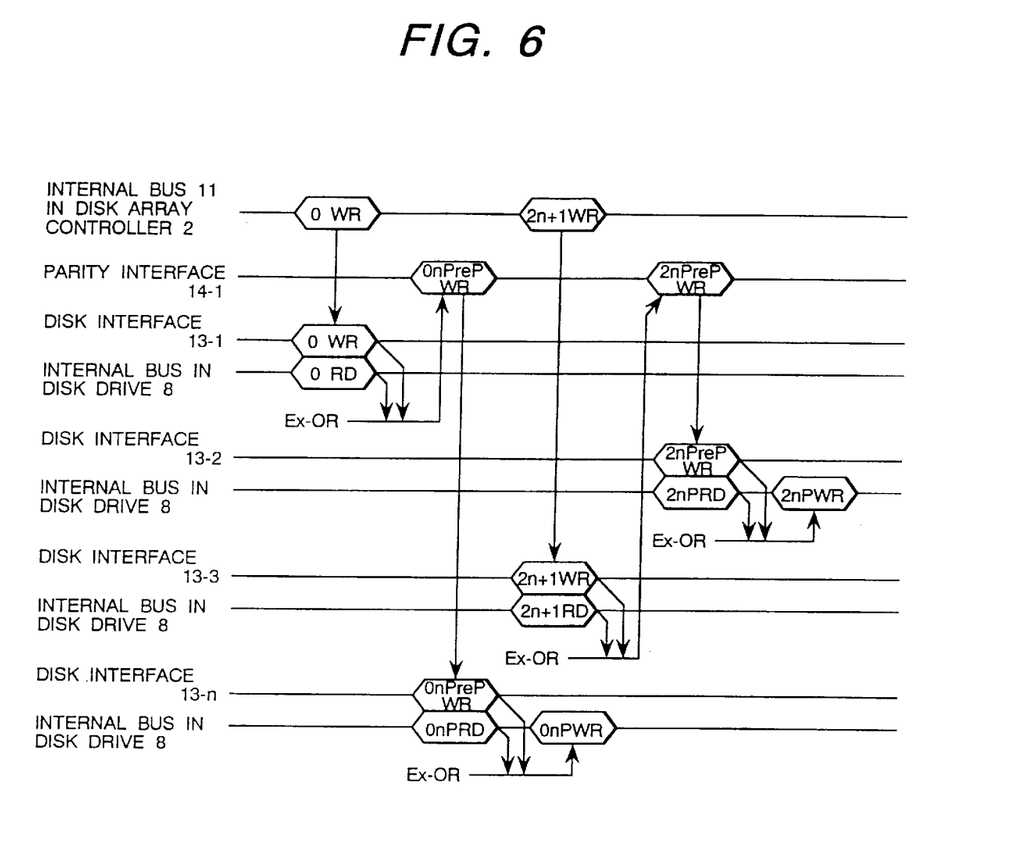
FIG. 6 is a time chart of the operation of RAID5 for writing in an embodiment of the present invention.

FIG. 6 shows detailed processing in the case of RAID5. The disk drive 8-11 which receives write data to address #0 from the disk controller 7-1 via the interface 13-1:

1) reports the end to the disk controller 7-1 at the time when all the data is received in the buffer memory 21 in the disk drive, 2) reads the old data at address #0 on the recording medium 26, (this process may be read at another address of the buffer memory B beforehand or may be executed in parallel with writing new data into the buffer), 3) calculates the exclusive OR of new data and the old data, 4) assumes the calculation result as pseudo-parity and transfers it to the disk drive for storing parity data at the corresponding address via the interface 14-1, and 5) writes the new data at address #0 on the disk medium.

The parity disk drive 8-1(n+1) which receives the pseudo-parity from the data disk drive 8-11 via the interface 14-1:

1) reports the end to the data disk drive at the time when all the data is received in the buffer memory 21 in the disk drive, 2) reads the old parity data at address #0nP on the recording medium 26, (this process may be read in the buffer memory 22 beforehand or may be executed in parallel with writing the pseudo-parity data into the buffer), 3) calculates the exclusive OR of the pseudo-parity data and the old parity data, and 4) assumes the calculation result as new parity data and writes it at address #0nP on the recording medium 26.

Since the parity disks are not fixed in RAID5, when the write process is being executed for the disk drive 8-11 in which a request address (for example, #0) of the host computer exists and the disk drive 8-1(n+1) in which the parity data exists, access to address #(2n+1) of another disk drive 8-13 and the disk drive 8-12 in which the parity data exists is possible. Therefore, when the system is designed so that a parity update process on the parity interface and a data write/read process on the controller interface can be executed by a plurality of disk drives in parallel, the system performance can be further improved.

According to the disk array subsystem of the present invention, updating of parity data for writing data is executed via the interface between the disk drives after a disk drive sends an end report to the disk controller, so that the delay time due to a write penalty can be shortened viewed from the host computer.

The invention claimed is:

1. A storage subsystem comprising:

a controller;

a redundancy data group which contains data and parity, and which is spread among a plurality of disk drives;

first paths coupled between one disk drive and another disk drive;

a plurality of second paths each coupled between different ones of disk drives and the controller; and each disk drive having an arithmetic unit which obtains an exclusive OR between a data that exits in the disk drive itself and either one of received data from the first path or the second path;

wherein if one disk drive receives a data of the redundancy data group from the second path, then the one disk drive calculates an exclusive OR between the received data and an old data of the redundancy data group, stores the receive data in the one disk drive as a new data of the redundancy data group, and sends the calculated exclusive OR to the first path, and wherein if another disk drive that stores a parity of the redundancy data group, receives the calculated exclusive OR of the redundancy data group from the first path, then the other disk drive calculates an exclusive OR between the calculated exclusive OR and the parity that is stored in the other disk drive, and stores a result of the exclusive OR as a new parity of the redundancy data group.

2. A storage subsystem according to claim 1, wherein said arithmetic unit includes:

a first buffer memory for storing data received from the first path;

a second buffer memory for storing data received from the second path;

a third buffer memory for storing data read from said one magnetic disk drive;

arithmetic means for calculating an exclusive OR between either one of the data from the first buffer or the second buffer; and a fourth buffer memory for storing the calculated result.

3. A storage subsystem comprising:

a controller;

a plurality of redundancy data groups each of which contains data and parity, and each of which is spread among a plurality of disk drives;

a plurality of first paths each coupled to a plurality of the disk drives thereby spreading a redundancy data group;

a plurality of second paths each of which couples one of the disk drives in one redundancy data group, one of the disk drive in another redundancy data group and the controller in series; and each disk drive having an arithmetic unit which obtains an exclusive OR between a data that exists in the disk drive itself and either one of received data from the first path or the second path;

wherein if one disk drive receives a data of the redundancy data group from the second path, then the one disk drive calculates an exclusive OR between the received data and an old data of the redundancy data group, stores the received data in the one disk drive as a new data of the redundancy data group, and sends the calculated exclusive OR to the first path, and wherein if another disk drive that stores a parity of the redundancy data group, receives the calculated exclusive OR of the redundancy data group from the first path, then the other disk drive calculates an exclusive OR between the calculated exclusive OR and the parity that is stored in the other disk drive, and stores a result of the exclusive OR as a new parity of the redundancy data group.

4. A storage subsystem according to claim 3, wherein said arithmetic unit includes:

a first buffer memory for storing data received from the first path;

a second buffer memory for storing data received from the second path;

a third buffer memory for storing data read from said one magnetic disk drive;

arithmetic means for calculating an exclusive OR between either one of the data from the first buffer or the second buffer; and a fourth buffer memory for storing the calculated result.

5. A storage subsystem comprising:

a controller;

a redundancy data group which contains data and parity, and which is spread among a plurality of disk drives;

a first path coupled to a plurality of the disk drives spreading a redundancy data group;

a second path coupled to the disk drives and the controller in series; and each disk drive having an arithmetic unit which obtains an exclusive OR between a data that exists in the disk drive itself and either one of received data from the first path or the second path;

wherein if one disk drive receives a data of the redundancy data group via second path from the controller, then the one disk drive calculates an exclusive OR between the received data and an old data of the redundancy data group, stores the received data in the one disk drive as a new data of the redundancy data group to the first path, and sends the calculated exclusive OR to the first path, and wherein if another disk drive that stores a parity of the redundancy data group, receives the calculated exclusive OR of the redundancy data group from the first path, then the other disk drive calculates an exclusive OR between the calculated exclusive OR and the parity that is stored in the other disk drive, and stores a result of the exclusive OR as a new parity of the redundancy data group.

6. A storage subsystem according to claim 5, wherein said arithmetic unit includes:

a first buffer memory for storing data received from the first path;

a second buffer memory for storing data received from the second path;

a third buffer memory for storing data read from said one magnetic disk drive;

arithmetic means for calculating an exclusive OR between either one of the data from the first buffer or the second buffer; and a fourth buffer memory for storing the calculated result.

7. A storage subsystem comprising:

a controller;

a plurality of disk drives, each disk drive having data and parities, the parity in one of the disk drives relates to data in another of the disk drives, and each disk drive has a function of obtaining an exclusive OR between a data that comes newly and a data that exists in the disk drive itself;

a first path coupled between one disk drive and another disk drive; and a plurality of second paths each coupled between different one of disk drives and the controller;

wherein if one of the disk drives receives a data from the second path, then the one disk drive obtains an exclusive OR between the received data and a data that exists in the one disk drive itself, and further the one disk drive sends the result of the exclusive OR to the first path, and wherein if another of the disk drives receives the result of the exclusive OR that comes via the first path from the one disk drive, then another of the disk drives obtains an exclusive OR between the result of the exclusive OR and a parity that relates to the data received by the one disk drive.

8. A storage subsystem according to claim 7, wherein said arithmetic unit includes:

a first buffer memory for storing data received from the first path;

a second buffer memory for storing data received from the second path;

a third buffer memory for storing data read from said one magnetic disk drive;

arithmetic means for calculating an exclusive OR between either one of the data from the first buffer or the second buffer; and a fourth buffer memory for storing the calculated result.

9. A storage subsystem comprising:

a controller;

a plurality of disk drives, each disk drive having data and parities, the parity in one of the disk drives relates to data in another of the disk drives, and each disk drive has a function of obtaining an exclusive OR between a data that comes newly and a data that exists in the disk drive itself;

a plurality of first paths each coupled between one disk drive and another disk drive; and a plurality of second paths each of which couples one disk drive, another disk drive and the controller in series;

wherein if one of the disk drives receives a data from the second path, then the one disk drive obtains an exclusive OR between the received data and a data that exists in the one disk drive itself, and further the one disk drive sends the result of the exclusive OR to the first path, and wherein if another of the disk drives receives the result of the exclusive OR that comes via the first path from the one disk drive, then another of the disk drives obtains an exclusive OR between the result of the exclusive OR and a parity that relates to the data received by the one disk drive.

10. A storage subsystem according to claim 9, wherein said arithmetic unit includes:

a first buffer memory for storing data received from the first path;

a second buffer memory for storing data received from the second path;

a third buffer memory for storing data read from said one magnetic disk drive;

arithmetic means for calculating an exclusive OR between either one of the data from the first buffer or the second buffer; and a fourth buffer memory for storing the calculated result.

11. A storage subsystem comprising:

a controller;

a plurality of disk drives, each disk drive having data and parities, the parity in one of the disk drives relates to data in another of the disk drives, and each disk drive has a function of obtaining exclusive OR between a data that comes newly and a data that exists in the disk drive itself;

a first path coupled between one disk drive and another disk drive; and a second path coupled to the disk drives and the controller in series;

wherein if one of the disk drives receives a data from the second path, then the one disk drive obtains an exclusive OR between the received data and a data that exists in the one disk drive itself, and further the one disk drive sends the result of the exclusive OR to the first path, and wherein if another of the disk drives receives the result of the exclusive OR that comes via the first path from the one disk drive, then another of the disk drives obtains an exclusive OR between the result of the exclusive OR and a parity that relates to the data received by the one disk drive.

12. A storage subsystem according to claim 11, wherein said arithmetic unit includes:

a first buffer memory for storing data received from the first path;

a second buffer memory for storing data received from the second path;

a third buffer memory for storing data read from said one magnetic disk drive;

arithmetic means for calculating an exclusive OR between either one of the data from the first buffer or the second buffer; and a fourth buffer memory for storing the calculated result.

* * * * *